United States Patent [19]
Sato et al.

[11] Patent Number: 4,775,911
[45] Date of Patent: Oct. 4, 1988

[54] MAGNETIC TAPE CASSETTE

[75] Inventors: Takateru Sato; Morimasa Sasaki, both of Saku, Japan

[73] Assignee: TDK Corporation, Tokyo, Japan

[21] Appl. No.: 58,732

[22] Filed: Jun. 5, 1987

[30] Foreign Application Priority Data

Jul. 3, 1986 [JP] Japan .............................. 61-101418[U]

[51] Int. Cl.4 .............................................. G11B 23/02
[52] U.S. Cl. ................................................... 360/132
[58] Field of Search ........................................ 360/132

[56] References Cited

U.S. PATENT DOCUMENTS 4,572,461  2/1986  Horikawa .................... 360/132 X
4,719,529  1/1988  Oishi ............................ 360/132

Primary Examiner—A. J. Heinz
Attorney, Agent, or Firm—Seidel, Gonda, Lavorgna & Monaco

[57] ABSTRACT

A magnetic tape cassette having a protective slide cover for a space between a front portion of the cassette and a pivotal front lid covering a magnetic tape exposed at the front portion. Forward end of the slide cover is provided with a projection adapted to engage the front lid to prevent the cover from deformation.

1 Claim, 5 Drawing Sheets

MAGNETIC TAPE CASSETTE

FIELD OF THE INVENTION

This invention relates to a magnetic tape cassette and more specifically to a magnetic tape cassette of the type equipped with a slide cover and which is protected against the deformation of the slide cover.

DESCRIPTION OF THE PRIOR ART

There are many different types of magnetic tape cassettes, including one for data recording as illustrated in FIG. 5. It may be briefly explained as follows. An upper case section 1 and a lower case section 2, both of rectangular shape mated along the peripheries to form a case, are formed with a pair each of openings 3, 4 in which a pair of reel hubs (not shown) with a magnetic tape wound thereon are fitted rotatably. The magnetic tape is partly pulled out to a running path at the front of the cassette (at the right in the drawings) to be driven from hub to hub. A front lid 5, hinged to the cassette at pivotal points on both sides of the frontal part of the cassette, protects the magnetic tape by covering the front face of the cassette. Also, to keep the magnetic tape from dust and the like, a slide cover 6 is provided so as to be slidable in the direction of the arrow. In the position shown, it covers the portion of the front face of the cassette where the magnetic tape runs and also covers openings 3, 4 that receive the reel hubs. Slide cover is engaged with a part of front lid 5 and locked. It is retained in the position by locks 7. As the cassette is loaded in a recorder, locks 7 are automatically released and the slide cover moves automatically in the direction of the arrow. Openings 8, 9 formed in slide cover 6 are then aligned with openings 3, 4 of the cassette to allow the insertion of recorder spindles and expose the running portion of the magnetic tape. Slide cover 6 in the closed position as shown in FIG. 6 interferes with and locks front lid 5. Its sliding in the arrow direction releases front lid 5 for free pivotal motion.

PROBLEMS OF THE PRIOR ART

There arises a problem when an external force is applied to the slide cover in the closed state as in FIG. 5. If, as in FIG. 6, the part A of the front edge of slide cover 6 (adjacent to front lid 5) is held by fingers or if the part receives an external force, the front edge of this slide cover will yield inward to touch an edge of the magnetic tape if the cover is made of thin plastic. When this happens, the tape can be wrinkled or in extreme cases scratched, hampering normal tape running or contact with the magnetic head. To avoid these, the slide cover must be made of material selected from highly rigid or thick materials. For a tape cassette, however, a construction of thin and ordinary material is still preferred because of its economic advantage and possibility of reducing the weight.

OBJECT OF THE INVENTION

The present invention has for its object to provide a magnetic tape cassette in which a slide cover, which covers a space between the front lid of the cassette and the case body to conceal the magnetic tape, is prevented from deformation with external forces, so that it can protect the magnetic tape.

SUMMARY OF THE INVENTION

The magnetic tape cassette of the present invention comprises a case in which a pair of reel hubs with a magnetic tape wound thereon is rotatably fitted, said case having a front face where the magnetic tape is partly exposed, a front lid pivotally connected to the front face of the case so as to be swingable to cover or uncover the face, and a slide cover movable toward and away from the front lid along the bottom of the case so as to shield or unshield a space between the front lid and the front face of the case, and characterized in that there is formed a projection from the front edge of the slide cover, and a corresponding cut is formed in the front lid, so that the projection engages with the cut as the slide cover moves forward to the closed position.

With the magnetic tape cassette of the present invention, the slide cover in the closed position will not be deformed upon application of an external force to the front edge of the cassette. This brings advantages that the magnetic tape is protected properly and the restrictions on the thickness and material quality of the slide cover are minimized.

DETAILED DESCRIPTION OF THE EMBODIMENT

An embodiment of the present invention will now be explained in detail with reference to the drawings.

Figure 5:
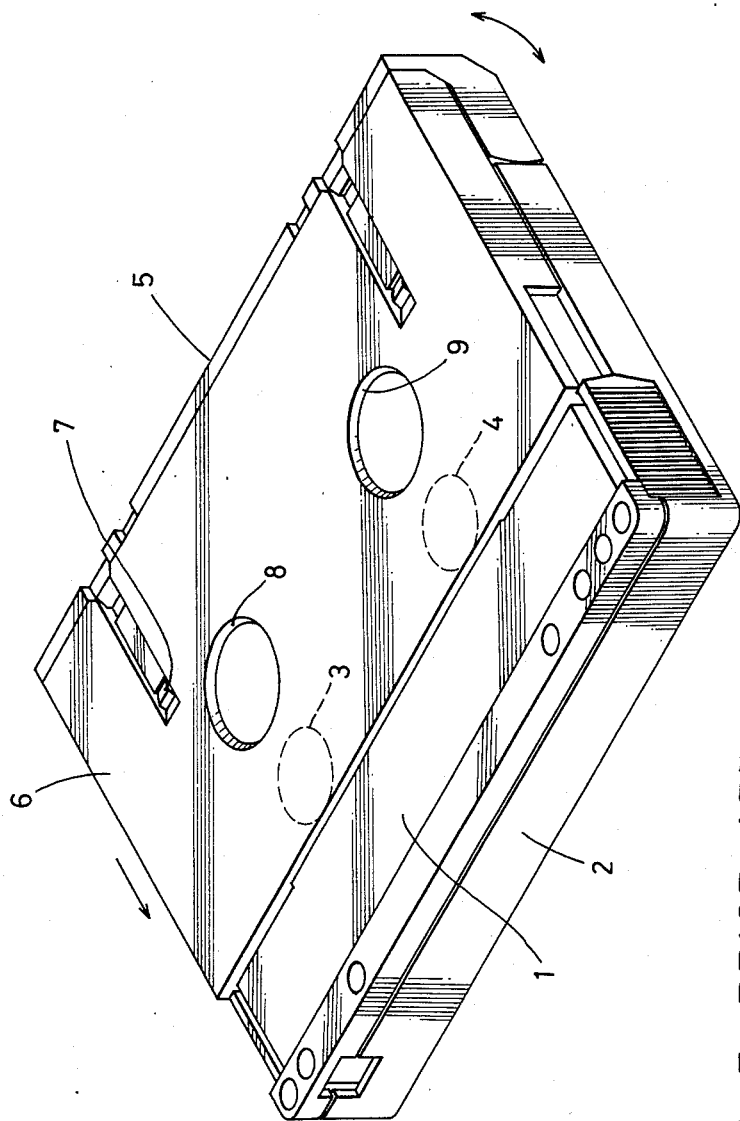
FIG. 5 is a bottom perspective view of a prior art magnetic tape cassette in the closed position.
Figure 6:
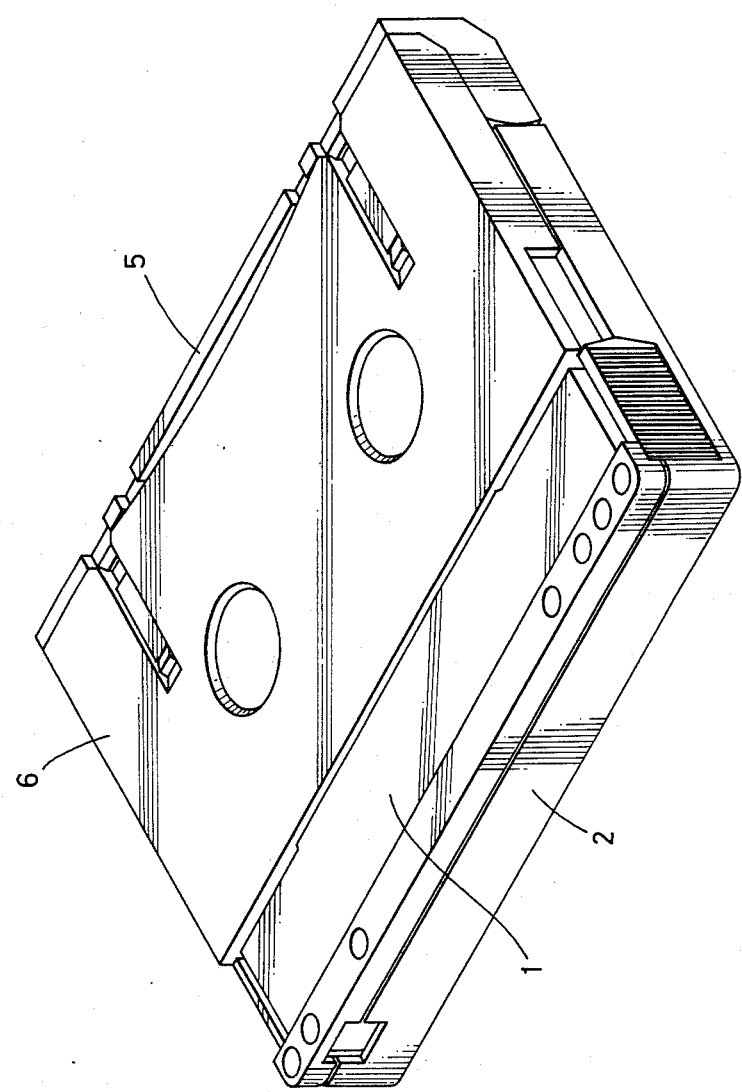
FIG. 6 is a bottom perspective view of the same cassette as deformed by external force.

Reference is made first to FIGS. 1 to 4. Parts like or similar to those shown in FIGS. 5 and 6 are given like numbers.

Figure 2:
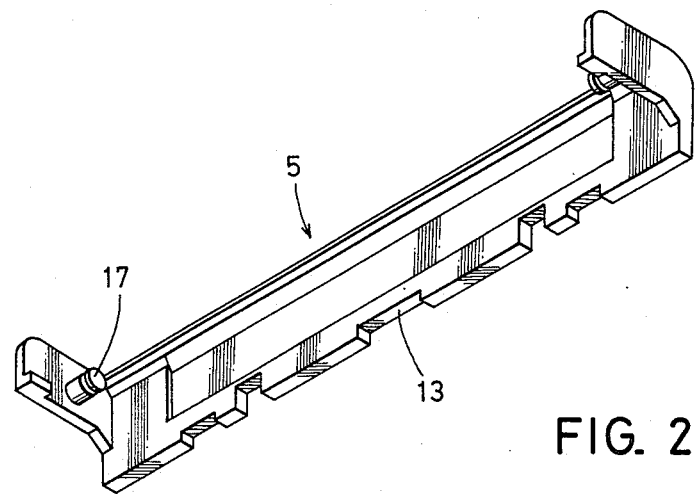
FIG. 2 is an inner perspective view of a front lid.
Figure 3:
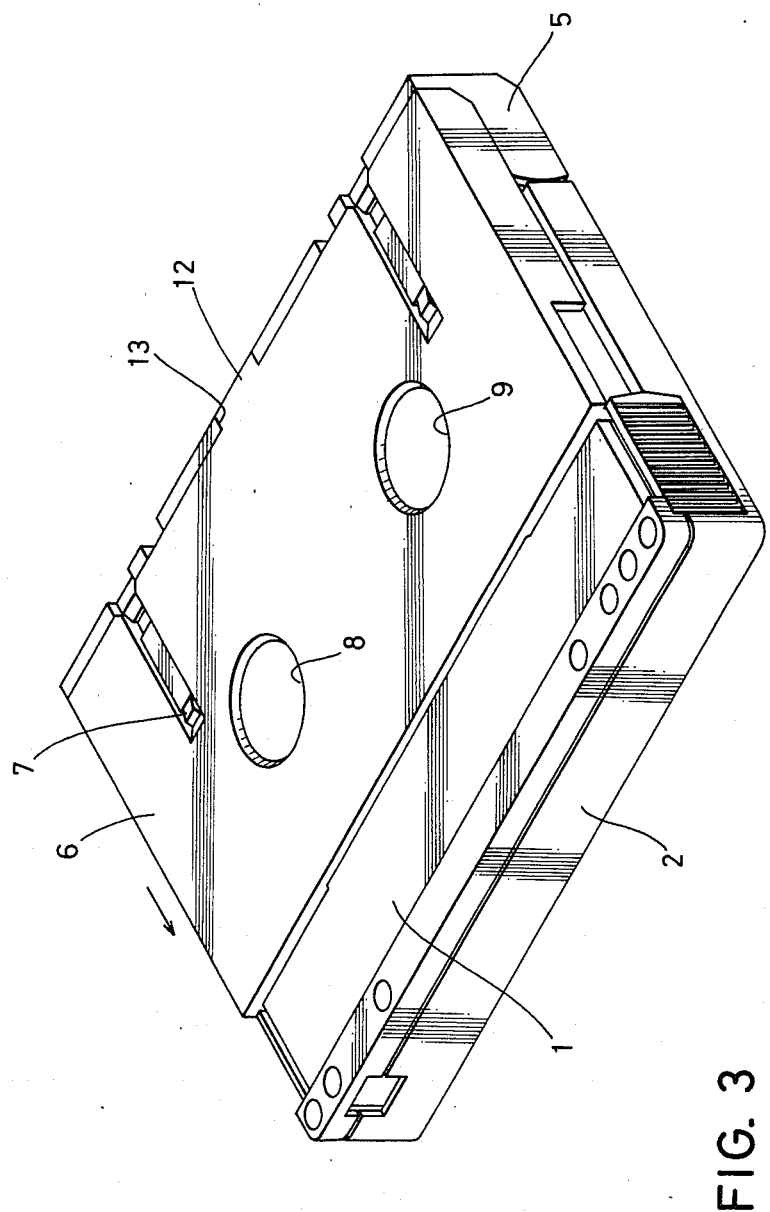
FIG. 3 is a bottom perspective view of a magnetic tape cassette of the invention in the closed position.
Figure 4:
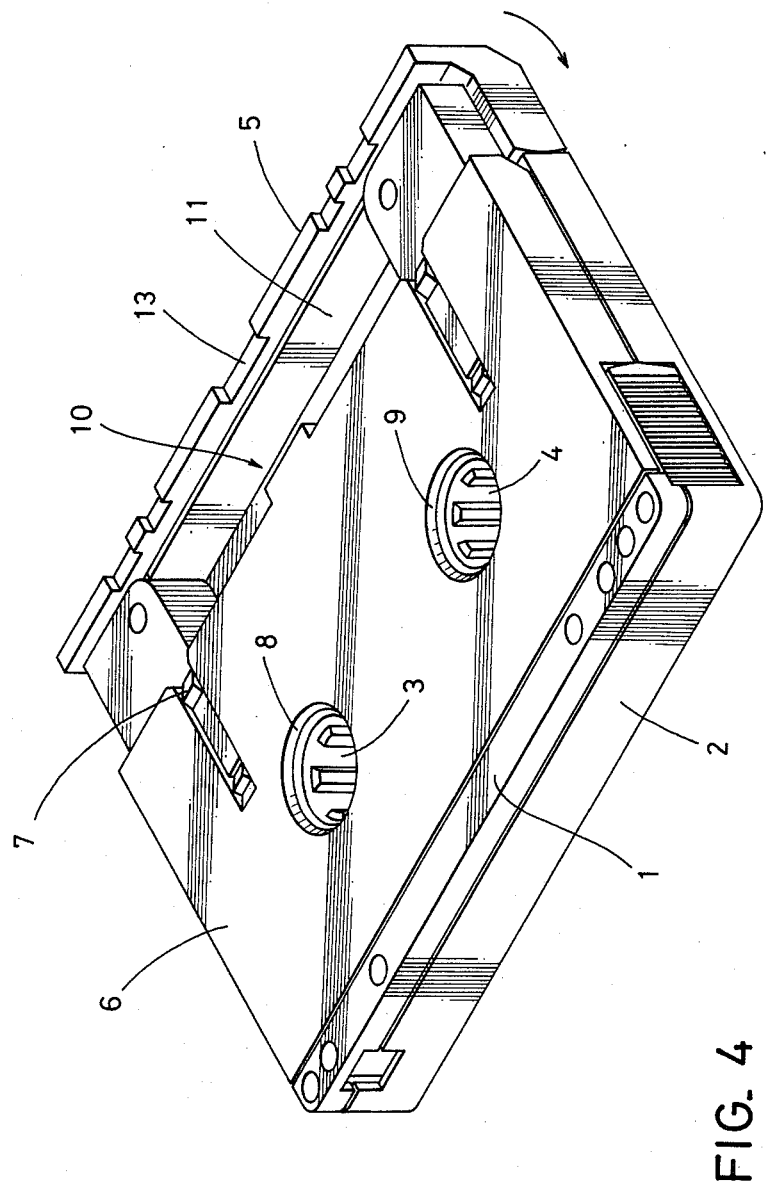
FIG. 4 is a bottom perspective view of the same cassette in the open position.

As illustrated in FIGS. 2 and 4, a magnetic tape cassette of the present invention holds in the space between a lower case section 1 and an upper case section 2 a magnetic tape 10 wound on a pair of reel hubs fitted in openings 3, 4, the magnetic tape being partly pulled out into a recess 11 at the front of the case. A front lid 5 which protects the tape is hinged to the both sides of the case. To the bottom face of the case (shown upside down in FIGS. 3 and 4) and par of the side faces is fitted a slide cover 6 which is slidable in the direction of the arrow, from a closed position (FIG. 3) where it protects the tape to an open position (FIG. 4) when the tape is used. In either position a pair of locks 7 work. Front lid 5 is pivotally swingable in the direction of the arrow as slide cover 6 slides from the position of FIG. 3 to the position of FIG. 4, thus exposing magnetic tape 10.

Figure 1:
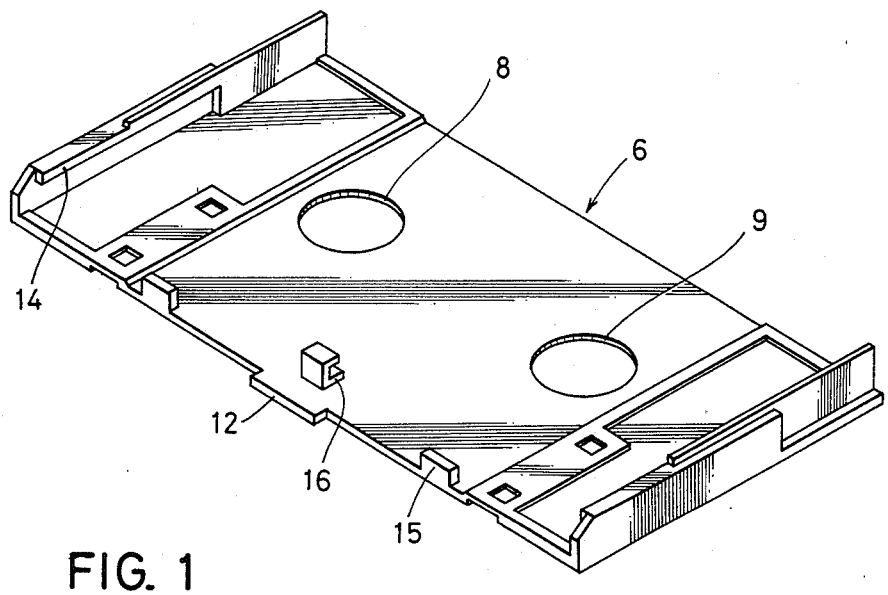
FIG. 1 is an inner perspective view of a slide cover of a magnetic tape cassette embodying the present invention.

FIG. 1 shows in detail the slide cover, and FIG. 2 the front lid. According to the present invention, there is formed a projection or extension 12 from the front edge on the front lid side of the slide cover, and a cut 13 is formed in the corresponding part of the front lid in order that projection 12 may mate with cut 13 when the slide cover is in the closed position. In FIGS. 1 and 2, numeral 14 is a guide rail (spline) of the side wall of the slide cover, 15 is a stopper, and 16 is a stop to engage with one end of a spring which normally biases the slide cover in the closing direction. 17 is a pivot pin provided on a side wall of the front lid.

Functional effects

As constructed above, the magnetic tape cassette of the present invention is adequately resistant to external forces which may be applied to it in the closed position and is protected from deformation, because projection 12 of the front edge of slide cover 6 is in engagement with cut 13 of front lid 5. Therefore, the magnetic tape has no danger of being deformed, either, nor of wrinkling or scratching. The arrangement makes the slide cover easier to design and enables it to be thinner than before to function as satisfactorily.

We claim:

1. A magnetic tape cassette comprising a case in which a pair of reel hubs with a magnetic tape wound thereon is rotatably fitted, said case having a front face where the magnetic tape is partly exposed, a front lid pivotally connected to the front face of said case so as to be swingable to cover or uncover the face, and a slide cover moveable toward and away from said front lid along the bottom of said case so as to shield or unshield a space between said front lid and the front face of said case, characterized in that there is formed a projection from a substantially central portion of the front edge of said slide cover, and a corresponding cut is formed in said front lid, said program extending away from the front edge of said slide cover in a direction toward the front lid so that said projection engages with said cut as said slide cover moves forward to the closed position such that a portion of the lid along the cut provides a support surface for the slide cover at the location of the projection whereby deformation of the cover by an external force is resisted.

* * * * *